United States Patent
Liu et al.

(10) Patent No.: US 10,605,959 B2
(45) Date of Patent: Mar. 31, 2020

(54) ANTIREFLECTIVE STACK FOR LOW LUMINANCE CONDITIONS

(71) Applicant: ESSILOR INTERNATIONAL (COMPAGNIE GENERALE D'OPTIQUE), Charenton-le-Pont (FR)

(72) Inventors: Yu Liu, Singapore (SG); Xingzhao Ding, Singapore (SG)

(73) Assignee: Essilor International, Charenton-le-Pont (FR)

( * ) Notice: Subject to any disclaimer, the term of this patent is extended or adjusted under 35 U.S.C. 154(b) by 275 days.

(21) Appl. No.: 15/540,224

(22) PCT Filed: Dec. 30, 2015

(86) PCT No.: PCT/EP2015/081447
§ 371 (c)(1),
(2) Date: Jun. 27, 2017

(87) PCT Pub. No.: WO2016/107916
PCT Pub. Date: Jul. 7, 2016

(65) Prior Publication Data
US 2019/0056530 A1  Feb. 21, 2019

(30) Foreign Application Priority Data

Dec. 31, 2014 (EP) ..................... 14307226

(51) Int. Cl.
*G02B 1/115* (2015.01)
*C03C 17/34* (2006.01)
*G02B 27/00* (2006.01)
*G02C 7/02* (2006.01)

(52) U.S. Cl.
CPC .......... *G02B 1/115* (2013.01); *C03C 17/3417* (2013.01); *G02B 27/0012* (2013.01); *G02C 7/02* (2013.01); *C03C 2217/734* (2013.01); *C03C 2218/151* (2013.01)

(58) Field of Classification Search
None
See application file for complete search history.

(56) References Cited

U.S. PATENT DOCUMENTS

| | | | |
|---|---|---|---|
| 4,211,823 A | 7/1980 | Suzuki et al. | |
| 5,015,523 A | 5/1991 | Kawashima et al. | |
| 5,081,192 A | 1/1992 | Tatemoto | |

(Continued)

FOREIGN PATENT DOCUMENTS

| | | |
|---|---|---|
| EP | 0404111 | 12/1990 |
| EP | 0614957 | 9/1994 |

(Continued)

OTHER PUBLICATIONS

Eloholma et al., "New Model for Mesopic Photometry and its Application to Road Lighting", Leukos, vol. 2, No. 4, (2006).

*Primary Examiner* — Darryl J Collins
*Assistant Examiner* — Journey F Sumlar
(74) *Attorney, Agent, or Firm* — Norton Rose Fulbright US LLP

(57) ABSTRACT

Ophthalmic lens comprising an anti-reflective stack designed for scotopic or mesopic conditions, wherein the anti-reflective stack design method uses the scotopic luminosity function CIE 1951 (defined by the Commission Internationale de l'Eclairage).

15 Claims, 5 Drawing Sheets

(56) References Cited

U.S. PATENT DOCUMENTS

| | | | |
|---|---|---|---|
| 5,316,791 A | 5/1994 | Farber et al. | |
| 5,763,061 A | 6/1998 | Ochiai et al. | |
| 5,922,787 A | 6/1999 | Kondo et al. | |
| 6,183,872 B1 | 2/2001 | Tanaka et al. | |
| 6,277,485 B1 | 8/2001 | Invie et al. | |
| 6,337,235 B1 | 1/2002 | Miyanaga et al. | |
| 2007/0002444 A1* | 1/2007 | Piers ........................ | G02B 3/04 |
| | | | 359/565 |

FOREIGN PATENT DOCUMENTS

| | | | |
|---|---|---|---|
| EP | 0680492 | 4/1997 | |
| EP | 0933377 | 8/1999 | |
| EP | 2988153 A1 * | 2/2016 | ............. G02B 1/115 |
| FR | 2702486 | 9/1994 | |
| JP | S6387223 | 4/1988 | |
| JP | S63141001 | 6/1988 | |
| WO | WO2011/080472 | 7/2011 | |
| WO | WO2012/076714 | 6/2012 | |
| WO | WO2013/171434 | 11/2013 | |

\* cited by examiner

ANTIREFLECTIVE STACK FOR LOW LUMINANCE CONDITIONS

CROSS-REFERENCE TO RELATED APPLICATIONS

This application is a national phase application under 35 U.S.C. § 371 of International Application No. PCT/EP2015/081447 filed 30 Dec. 2015, which claims priority to European Patent Application No. 14307226.2 filed 31 Dec. 2014. The entire contents of each of the above-referenced disclosures is specifically incorporated by reference herein without disclaimer.

BACKGROUND OF THE INVENTION

I. Field of the Invention

The present invention relates to an optical article comprising an anti-reflective coating which strongly reduces reflection in the visible region and which takes into account the specificity of scotopic vision for the human visual system.

II. Description of Related Art

Currently in the ophthalmic industry, anti-reflective coatings are widely used for minimizing the reflection from lenses in order to improve wearer's comfort as well as aesthetics. Generally, the key objective of antireflection design is to reach a reflectance as low as possible, while taking into account different constraints, e.g., manufacturing process, color robustness and number of layers, etc. An antireflection coating usually consists of multilayers comprising interferential thin layers, generally an alternation of layers based on a dielectric material of high refractive index and a dielectric material of low refractive index. When deposited on a transparent substrate, the function of such a coating is to reduce its light reflection and therefore to increase its light transmission. A substrate thus coated will therefore have its transmitted light/reflected light ratio increased, thereby improving the visibility of objects placed behind it. When it is sought to achieve a maximum antireflection effect, it is then preferable to provide both faces (front and rear faces) of the substrate with this type of coating.

This anti-reflective coating is usually used in the ophthalmic field. Accordingly, traditional anti-reflective coatings are designed and optimized to reduce reflection on the lens surface in the visible region, typically within the spectrum range of from 380 to 780 nm. In general, the mean light reflection factor in the visible region on the front and/or rear faces of an ophthalmic lens is between 1.5 to 2.5%.

As reflectance is a function of wavelength, and because the human eye has different sensitivity for various wavelength, the mean light reflection $R_v$ of anti-reflective design is described by following equation:

$$R_V = \frac{\int_{380}^{780} R(\lambda) \cdot V(\lambda) \cdot D_{65}(\lambda) \cdot d\lambda}{\int_{380}^{780} V(\lambda) \cdot D_{65}(\lambda) \cdot d\lambda}$$

where $R(\lambda)$ is the reflectance at wavelength of $\lambda$ as shown in FIG. 1, $V(\lambda)$ is the eye sensitivity function $V(\lambda)$ in CIE 1931, $D_{65}(\lambda)$ is the daylight illuminant defined in standard CIE S005/E-1998.

However, it is known that when luminance level decreases, human vision system functions differently, as illustrated in FIG. 2 (E. Fred Schubert, *Detailed Information on LEDs*, CHAPTER 16: HUMAN EYE SENSITIVITY AND PHOTOMETRIC QUANTITIES). It is well demonstrated that in reduced luminance levels, scotopic vision is dominating. Under such condition, the sensitivity of human eyes is different as compared to that under normal luminance levels, also known as photopic vision. The eye sensitivity function for scotopic vision is well described in CIE in 1951 as V'($\lambda$).

Therefore, all current anti-reflective designs which are calculated and simulated based on V($\lambda$) in CIE 1931, are not accurate for scotopic vision. It is worth noting that for scotopic vision in which light is rare, lowering reflectance is of primary importance.

Therefore, there is still a need to provide novel anti-reflective coatings having very good anti-reflective properties accurate for scotopic vision versus the anti-reflective coatings of the prior art.

SUMMARY OF THE INVENTION

An object of the invention is to remedy the above drawbacks by seeking to develop a transparent optical article, especially an ophthalmic lens, comprising a substrate in mineral or organic glass comprising at least an anti-reflective coating, said anti-reflective coating possessing very good anti-reflective performances in scotopic conditions.

In order to improve the accuracy of the AR design for low luminance condition, e.g., for night vision & nigh activities, we propose the following calculation:

$$R'_V = \frac{\int_{380}^{780} R(\lambda) \cdot V'(\lambda) \cdot Ilum(\lambda) \cdot d\lambda}{\int_{380}^{780} V'(\lambda) \cdot Ilum(\lambda) \cdot d\lambda}$$

where $R(\lambda)$ is the reflectance at wavelength of $\lambda$, Ilum($\lambda$) is a reference illuminant (such as the daylight spectrum which is represented by $D_{65}(\lambda)$. Instead of using the spectral luminous efficiency function of eye V($\lambda$) in CIE 1931, here spectral luminous efficiency function of eye V'($\lambda$) in CIE 1951 for scotopic vision is employed in the calculation and simulation.

Comparing V($\lambda$) in CIE 1931 and V'($\lambda$) in CIE 1951, eye sensitivity function for scotopic vision shows clear blue shift with the peak value around 507 nm. Using the new proposed solution, the new anti-reflective design is able to give greater consideration to shorter wavelengths, which will reduce the perceived reflection under the low luminance conditions of scotopic vision. In turn, overall transmittance of the lens could be increased, which is particularly important for night vision.

The first example of anti-reflective stack disclosed in international patent application WO2013171434 is used to illustrate the impact of eye sensitivity function employed, e.g., V($\lambda$) vs. V'($\lambda$). For this example, R'$_V$ is significantly higher than R$_V$ (1.85% and 0.52%, respectively). Thus, optimization for R$_V$ using V($\lambda$) does not optimize for scotopic vision as optimization for R'$_V$ using V'($\lambda$).

In addition, for mesopic vision, in which both photopic and scotopic vision are "collaborating" (see FIG. 2), optimization of an anti-reflective stack could be based on an average spectral luminous efficiency function defined by $$V_{\alpha,\beta}(\lambda) = \alpha V(\lambda) + \beta V'(\lambda)$$

with V(λ) is in CIE 1931 and V'(λ) is in CIE 1951. The value of a can be determined with luminance conditions, according to various models. Some example values for a are shown in TABLE 1, wherein values as proposed by two organizations, MOVE and Light Research Center (LRC), are provided (M Elohoma and L Halonen: NEW MODEL OF MESOPIC PHOTOMETRY AND ITS APPLICATION TO ROAD LIGHTING LEUKOS, April 2006, VOL 2, No 4, published by the Illuminating Engineering Society). Further, α and β may be selected in the range of 0 to 1, and wherein α=1−β, without limiting the generality of this model as calculation are normalized. For pure scotopic conditions, α=0. For pure photopic conditions, α=1. Further, in some embodiments herein, scotopic conditions are those wherein luminance is lower than $10^{-2}$ cd/m² and mesopic conditions are those wherein luminance is lower than 10 cd/m².

TABLE 1

| Luminance | Blue-heavy α values | | Red-heavy α values | |
| --- | --- | --- | --- | --- |
| (cd/m²) | MOVE | LRC | MOVE | LRC |
| 0.01 | 0.13 | 0.04 | 0.00 | 0.01 |
| 0.1 | 0.42 | 0.28 | 0.34 | 0.11 |
| 1.0 | 0.70 | 1.00 | 0.68 | 1.00 |
| 10 | 0.98 | 1.00 | 0.98 | 1.00 |

Applying the new proposed solution, in some embodiments, there are provided ophthalmic lenses comprising an anti-reflective stack designed for scotopic or mesopic conditions, wherein the anti-reflective stack design method uses the spectral luminous efficiency function V'(λ) as defined in CIE 1951.

In some other embodiments, there is provided an ophthalmic lens rated for quantifying the anti-reflective efficiency of an ophthalmic lens in scotopic and/or mesopic conditions, the ophthalmic lens comprising a front face coated with a multilayered anti-reflective stack and an indication of a visual rating associated with the ophthalmic lenses, the rating including a ratio based on values α and β defining the average spectral luminous efficiency function $V_{\alpha,\beta}(\lambda)$ used for designing the anti-reflective stack.

In other embodiments, there are provided methods of designing an anti-reflective stack by identifying a luminance in the scotopic vision regime, calculating the weighted mean light reflection under the scotopic conditions $R'_V$ of an anti-reflective stack having a light reflection spectrum R(λ) according to:

$$R'_V = \frac{\int_{380}^{780} R(\lambda) \cdot V_{0,1}(\lambda) \cdot Ilum(\lambda) \cdot d\lambda}{\int_{380}^{780} V_{0,1}(\lambda) \cdot Ilum(\lambda) \cdot d\lambda},$$

and designing an anti-reflective stack by selecting materials to achieve the light reflection spectrum R(λ) yielding the calculated $R'_V$ value, wherein $V_{0,1}(\lambda)$=V'(λ) is in CIE 1951 and Ilum(λ) is a reference illuminant.

In yet other embodiments, there are provided methods of designing an anti-reflective stack by identifying a range of luminance in the scotopic and/or mesopic vision regime, calculating the average spectral luminous efficiency function $V_{\alpha,\beta}(\lambda)$ of the range of luminance according to:

$$V_{\alpha,\beta}(\lambda) = \alpha V(\lambda) + \beta V'(\lambda),$$

wherein α and β are selected according to the luminance conditions, β>0, V(λ) is in CIE 1931 and V'(λ) is in CIE 1951, and designing an anti-reflective stack by use of $V_{\alpha,\beta}(\lambda)$ function.

In still other embodiments, there are provided methods of providing to a customer of an ophthalmic lens a rating of the ophthalmic lens with respect to luminance conditions, the rating being based on a ratio which quantifies the anti-reflective efficiency of the ophthalmic lens in scotopic or mesopic conditions, the methods comprising the steps of: (a) identifying a range of luminance in the scotopic and/or mesopic vision regime; (b) identifying the average spectral luminous efficiency function $V_{\alpha,\beta}(\lambda)$ adapted to this range of luminance and calculating a ratio based on α and β; and (c) providing to a customer the rating of the ophthalmic lens.

In further embodiments, the performance of the methods or production of the coated object requires a computer. In some instances, it requires a specialized computer to perform the required function(s). In other instances, the specialized computer is designed to or is modified to be able to perform the required function. In yet other instances, an apparatus or multiple apparatuses are used to perform the required function(s).

In some embodiments the coating is designed for luminance in a predetermined activity, such as night fishing/hunting/gathering, trail running, driving or controlling a mobile object in low light conditions (night, snow, fog . . . ), stargazing, working/employment in low light conditions, watching a performance, diving, photographing or filming in low light conditions, or regular living activities in scotopic and/or mesopic conditions, etc.

In yet other embodiments the anti-reflective coating is on an ophthalmic lens capable of being use to direct light to a human subject's eye. In some instances, the subject is an athlete, performer, or participant in activities in scotopic and/or mesopic conditions. In some instances, the subject is a participant in driving or in controlling a vehicle or animal. In other instances, the subject is a participant in, spectator of, or performer of work, entertainment, hunting/fishing/gathering, athletics, or regular living activities in scotopic and/or mesopic conditions.

DETAILED DESCRIPTION OF THE INVENTION

Figure 1:
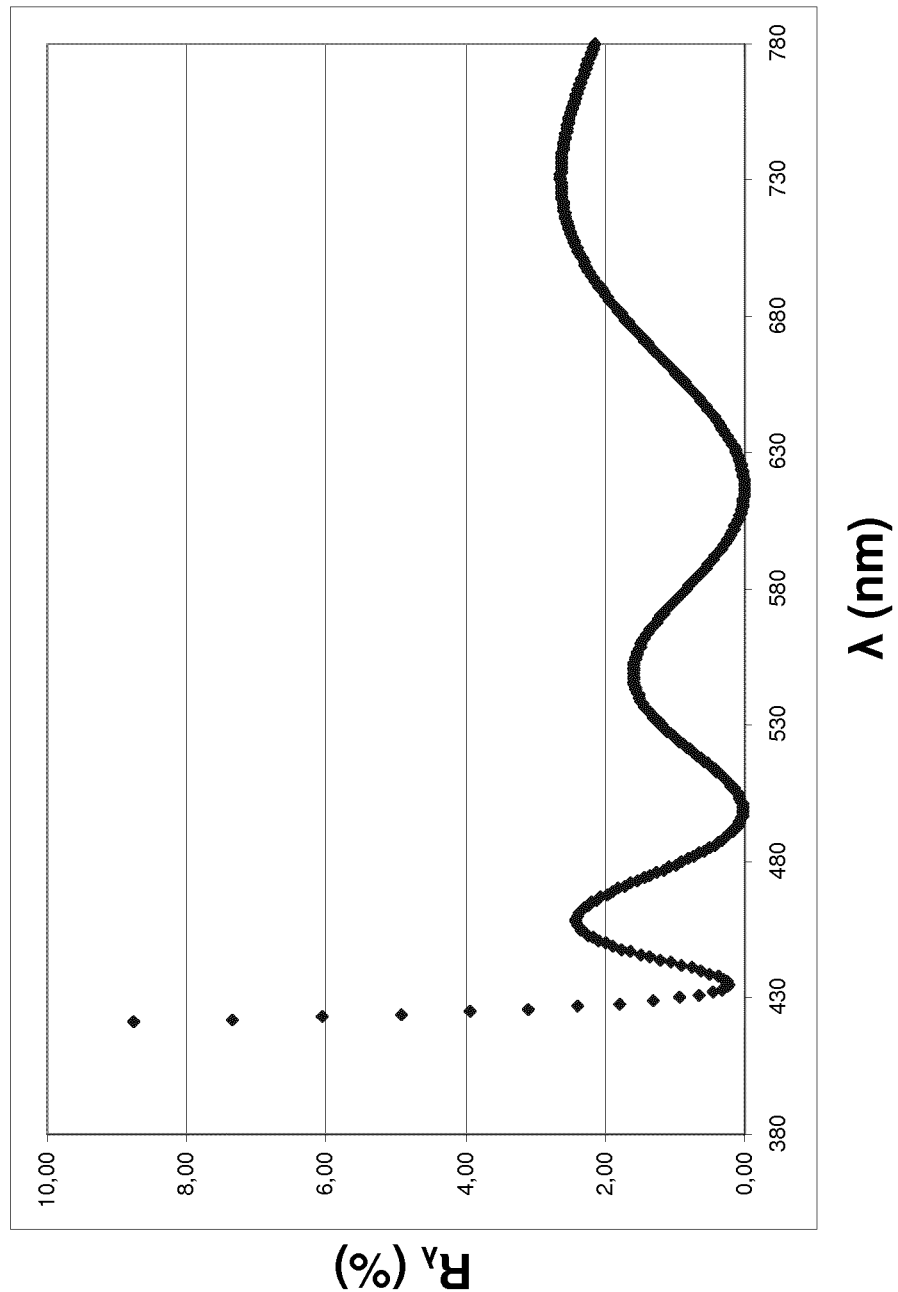
FIG. 1 illustrates a typical example of the reflection spectrum of an anti-reflective coating in the in ophthalmic industry, which can be represented by R(λ).
Figure 2:
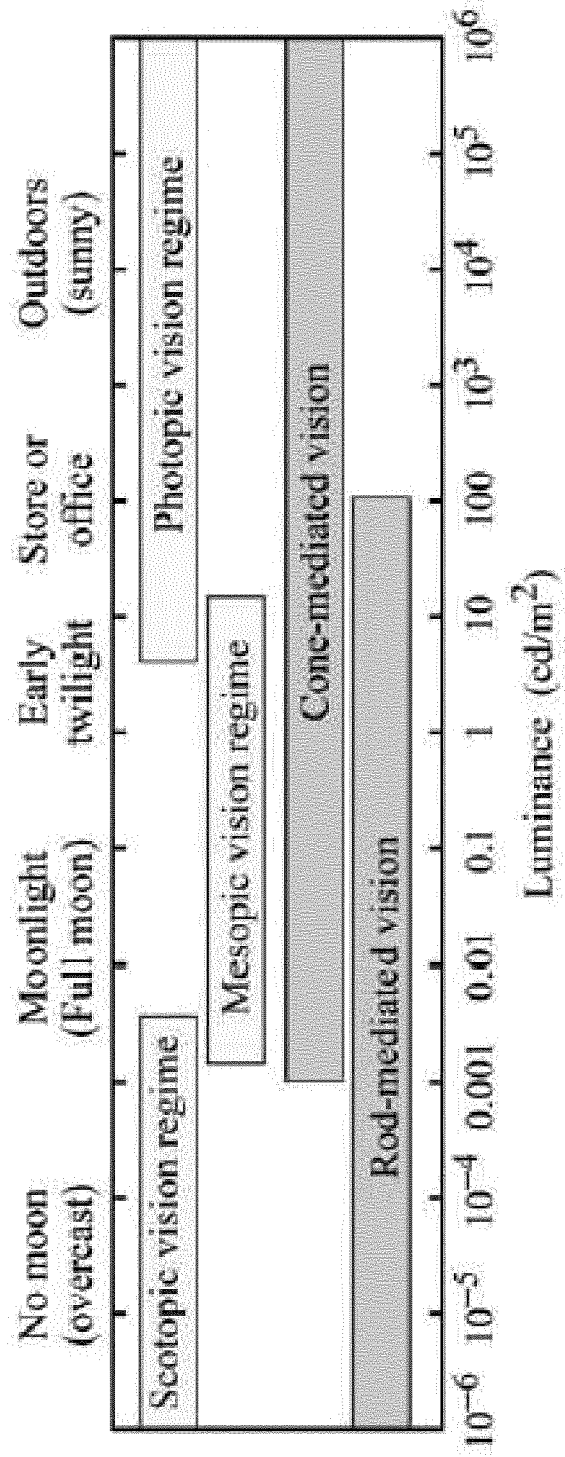
FIG. 2 illustrates human vision and receptor regimes. E. Fred Schubert, *Detailed Information on LEDs*, CHAPTER 16: HUMAN EYE SENSITIVITY AND PHOTOMETRIC QUANTITIES (Dec. 12, 2014).

Throughout this application, the term "about" is used to indicate that a value includes the inherent variation of error for the measurement or quantitation method.

Also unless otherwise indicated, the indication of an interval of values «from X to Y» or "between X and Y", according to the present invention, means as including the values of X and Y.

The use of the word "a" or "an" when used in conjunction with the term "comprising" may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The compositions and methods for their use can "comprise," "consist essentially of," or "consist of" any of the ingredients or steps disclosed throughout the specification. Compositions and methods "consisting essentially of" any of the ingredients or steps disclosed limits the scope of the claim to the specified materials or steps which do not materially affect the basic and novel characteristic of the claimed invention.

It is contemplated that any embodiment discussed in this specification can be implemented with respect to any method or composition of the invention, and vice versa. Furthermore, compositions of the invention can be used to achieve methods of the invention.

In the present application, when an optical article comprises one or more coatings onto the surface thereof, the expression "to deposit a layer or a coating onto the article" is intended to mean that a layer or a coating is deposited onto the external (exposed) surface of the outer coating of the article, that is to say the coating that is the most distant from the substrate.

A coating, that is said to be "on" a substrate or deposited "onto" a substrate is defined as a coating, which (i) is positioned above the substrate, (ii) is not necessarily in contact with the substrate, that is to say one or more intermediate coatings may be arranged between the substrate and the coating in question, and (iii) does not necessarily completely cover the substrate.

In a preferred embodiment, the coating on a substrate or deposited onto a substrate is in direct contact with this substrate.

When "a layer 1 is lying under a layer 2", it is intended to mean that layer 2 is more distant from the substrate than layer 1.

As used herein, the rear (or the inner) face of the substrate is intended to mean the face which, when using the article, is the nearest from the wearer's eye. It is generally a concave face. On the contrary, the front face of the substrate, is the face which, when using the article, is the most distant from the wearer's eye. It is generally a convex face.

The optical article prepared according to the present invention is a transparent optical article, preferably a lens or lens blank, and more preferably an ophthalmic lens or lens blank. The optical article may be corrective or uncorrective (ie. piano) lenses, goggles or, eye protection lenses. The optical article may be coated on its convex main side (front side), concave main side (back side), or both sides using the process of the invention.

Generally speaking, the anti-reflective coating of the optical article according to the invention, which will be called the "the anti-reflective coating", may be deposited onto any substrate, and preferably onto organic lens substrates, for example a thermoplastic or thermosetting plastic material.

Thermoplastic may be selected from, for instance: polyamides; polyimide; polysulfones; polycarbonates and copolymers thereof; polyethylene terephthalate and poly(methylmethacrylate) (PMMA).

Thermoset materials may be selected from, for instance: cycloolefin copolymers such as ethylene/norbornene or ethylene/cyclopentadiene copolymers; homo- and copolymers of allyl carbonates of linear or branched aliphatic or aromatic polyols, such as homopolymers of diethylene glycol bis(allyl carbonate) (CR 39®); homo- and copolymers of (meth)acrylic acid and esters thereof, which may be derived from bisphenol A; polymer and copolymer of thio(meth) acrylic acid and esters thereof, polymer and copolymer of allyl esters which may be derived from Bisphenol A or phthalic acids and allyl aromatics such as styrene, polymer and copolymer of urethane and thiourethane, polymer and copolymer of epoxy, and polymer and copolymer of sulphide, disulfide and episulfide, and combinations thereof.

As used herein, a (co)polymer is intended to mean a copolymer or a polymer. As used herein, a (meth)acrylate is intended to mean an acrylate or a methacrylate. As used herein, a polycarbonate (PC) is intended to mean either homopolycarbonates or copolycarbonates and block copolycarbonates.

Prior to depositing the anti-reflective coating onto the optionally coated substrate, for example with an abrasion-resistant layer and/or a scratch-resistant coating or with a sub-layer, the surface of said optionally coated substrate is usually submitted to a physical or chemical surface activating treatment, so as to reinforce the adhesion of the anti-reflective coating. Such pre-treatment is generally conducted under vacuum. It may be a bombardment with energetic and/or reactive species, for example with an ion beam ("Ion Pre-Cleaning" or "IPC") or with an electron beam, a corona discharge treatment, an ion spallation treatment, an ultraviolet treatment or a plasma-mediated treatment under vacuum, generally using an oxygen or an argon plasma. It may also be an acid or basic treatment and/or a solvent-based treatment (water, hydrogen peroxide or any organic solvent).

According to the invention, the "angle of incidence (symbol s)" is the angle formed by a ray light incident on an ophthalmic lens surface and a normal to the surface at the point of incidence. The ray light is for instance an illuminant light source, such as the standard illuminant $D_{65}$ as defined in the international colorimetric CIE L*a*b*. Generally the angle of incidence changes from 0° (normal incidence) to 900 (grazing incidence). The usual range for angle of incidence is from 0° to 750. For small angles of incidence (typically below 20°), antireflection is useful to maximize light coming to the wearer eyes and to avoid unpleasant reflection for people surrounding the wearer. Such property is mainly desirable for front face of ophthalmic lens, i.e. the face of the ophthalmic lens which is the most distant from wearer's eye. For larger angles of incidence (typically from 20° to 500) antireflection is useful to avoid reflection of light coming from the back (or the side) of the wearer. Such property is mainly desirable for rear face of ophthalmic lens, i.e. the face of the ophthalmic lens which is the nearest from wearer's eye.

The colorimetric coefficients of the optical article of the invention in the international colorimetric system CIE L*a*b* are calculated between 380 and 780 nm, taking the standard illuminant $D_{6s}$ and the observer into account (angle of 10°). It is possible to prepare anti-reflective coatings, without limitation as regards their hue angle. The observer is a "standard observer" as defined in the international colorimetric system CIE L*a*b*.

In the present application, the "mean reflection factor," noted Rm, is such as defined in the ISO 13666:1998 Standard, and measured in accordance with the ISO 8980-4 Standard, i.e., this is the (non-weighted) spectral reflection average over the whole visible spectrum between 400 and 700 nm. Rm is usually measured for an angle of incidence lower than 17°, typically of 15°, but can be evaluated for any angle of incidence.

Applying the new proposed solution, in some embodiments, there are provided ophthalmic lenses comprising an anti-reflective stack designed for scotopic or mesopic conditions, wherein the anti-reflective stack design method uses the spectral luminous efficiency function $V'(\lambda)$ as defined in CIE 1951. In one instance, the ophthalmic lens above further comprises wherein the anti-reflective stack design method uses an average spectral luminous efficiency function $V_{\alpha,\beta}(\lambda) = \alpha V(\lambda) + \beta V'(\lambda)$, with $\beta>0$, $V(\lambda)$ is in CIE 1931 and $V'(\lambda)$ is in CIE 1951. In another instance, any one of the ophthalmic lens above further comprises wherein the anti-reflective stack has a weighted mean light reflection $R_V^{\alpha,\beta}$ value that is calculated according to:

$$R_V^{\alpha,\beta} = \frac{\int_{380}^{780} R(\lambda) \cdot V_{\alpha,\beta}(\lambda) \cdot Ilum(\lambda) \cdot d\lambda}{\int_{380}^{780} V_{\alpha,\beta}(\lambda) \cdot Ilum(\lambda) \cdot d\lambda}$$

wherein $R(\lambda)$ is the light reflection spectrum of the anti-reflective stack and $Ilum(\lambda)$ is a reference illuminant. $R_V^{\alpha,\beta}$ may be calculated for any angle of incidence. In a particular embodiment, for front face of lenses, angle of incidence below 20° are especially considered. In other particular embodiments, for rear face of lenses, larger angles of incidence, from 20° to 50° are particularly adapted.

In other embodiments, there are provided methods of designing an anti-reflective stack comprising: (a) identifying a luminance in the scotopic vision regime (e.g., $\alpha=0$); (b) calculating the weighted mean light reflection in scotopic conditions $R'_V$ of an anti-reflective stack having a light reflection spectrum $R(\lambda)$ according t $$R'_V = \frac{\int_{380}^{780} R(\lambda) \cdot V_{0,1}(\lambda) \cdot Ilum(\lambda) \cdot d\lambda}{\int_{380}^{780} V_{0,1}(\lambda) \cdot Ilum(\lambda) \cdot d\lambda};$$

and (c) designing an anti-reflective stack by selecting materials to achieve the light reflection spectrum $R(\lambda)$ yielding the calculated $R'_V$ value, wherein $V_{0,1}(\lambda) = V'(\lambda)$ is in CIE 1951 and $Ilum(\lambda)$ is a reference illuminant. In one instance, the method further comprises wherein $R'_V$ is less than or equal to 1%, preferably less than or equal to 0.5%. In an additional instance, the method above further comprises wherein luminance is lower than $10^{-2}$ cd/m². In another additional instance, the method further comprises wherein luminance is determined for a predetermined activity, such as fishing, hunting, gathering, trail running, driving or controlling a mobile object, stargazing, working/employment, watching a performance, diving, photographing or filming, or regular living activities in low light conditions. In yet another instance, the methods above are defined as manufacturing an ophthalmic lens having an anti-reflective stack, further comprising: (d) providing an optical article having two main faces; and (e) forming the anti-reflective stack on at least one main face of the ophthalmic lens.

In yet other embodiments, there are provided methods of designing an anti-reflective stack comprising: (a) identifying a range of luminance in the scotopic and/or mesopic vision regime (e.g., $0<\alpha<1$); (b) calculating the average spectral luminous efficiency function $V_{\alpha,\beta}(\lambda)$ of the range of luminance according to:

$$V_{\alpha,\beta}(\lambda) = \alpha V(\lambda) + V'(\lambda),$$

wherein $\alpha$ and $\beta$ are selected according to the luminance conditions, $\beta>0$, $V(\lambda)$ is in CIE 1931 and $V'(\lambda)$ is in CIE 1951; and (c) designing an anti-reflective stack by use of $V_{\alpha,\beta}(\lambda)$ function. In one instance, step (c) of the method of design of an anti-reflective stack comprises the following steps: (c1) calculating the weighted mean light reflection $R_V^{\alpha,\beta}$ of an anti-reflective stack having a light reflection spectrum $R(\lambda)$ according to:

$$R_V^{\alpha,\beta} = \frac{\int_{380}^{780} R(\lambda) \cdot V_{\alpha,\beta}(\lambda) \cdot Ilum(\lambda) \cdot d\lambda}{\int_{380}^{780} V_{\alpha,\beta}(\lambda) \cdot Ilum(\lambda) \cdot d\lambda};$$

and (c2) designing an anti-reflective stack by selecting materials to achieve the light reflection spectrum $R(\lambda)$ yielding the calculated $R_V^{\alpha,\beta}$ value, wherein $Ilum(\lambda)$ is a reference illuminant. In another instance, any of the methods above further comprises wherein $R_V^{\alpha,\beta}$ is less than or equal to 1%, preferably less than or equal to 0.5%. In an additional instance, any of the methods disclosed herein further comprise wherein luminance is lower than 10 cd/m². In yet another instance, the methods above are defined as manufacturing an ophthalmic lens having an anti-reflective stack, further comprising: (d) providing an optical article having two main faces; and (e) forming the anti-reflective stack on at least one main face of the ophthalmic lens.

In yet some other embodiments, an ophthalmic lens according to the embodiments above further comprises a transparent substrate with a front main face and with a rear main face, at least one of the main faces being coated with a multilayered anti-reflective stack comprising at least one layer having a refractive index higher than or equal to 1.55 and at least one layer having a refractive index lower than 1.55, such that: the mean light reflection factor in the visible region for photopic vision $R_V$ with $D_{65}$ illuminant is lower than or equal to 0.5%, for at least an angle of incidence lower than 35°; and the mean light reflection factor in the visible region for scotopic or mesopic vision $R_V^{\alpha,\beta}$ with $D_{65}$ illuminant is lower than the mean light reflection factor in the visible region for photopic vision $R_V$ for at least an angle of incidence lower than 35° and a ratio $\alpha/\beta \leq 10$, $\alpha/\beta \leq 1$, $\alpha/\beta \leq 0.5$. In one instance, any of the ophthalmic lenses disclosed herein comprise wherein the multilayered anti-reflective coating comprises a number of layers higher than or equal to 3 and lower than or equal to 10, preferably higher than or equal to 4 and lower than or equal to 6. In another instance, any of the ophthalmic lens disclosed herein further comprise wherein the hue of the light reflected by the anti-reflective coating is in the range from 0° to 150° for at least an angle of incidence lower than 35°. In yet another instance, any of the ophthalmic lens disclosed herein further comprise wherein average reflection Rm of anti-reflective coating is lower than 1% for at least an angle of incidence lower than 35°. In an additional instance, any of the ophthalmic lenses disclosed herein further comprise wherein the anti-reflective coating comprises, in the direction moving away from the substrate, a layer having a refractive index higher than or equal to 1.55 with a thickness of from 10 to 25 nm, a layer having a refractive index lower than 1.55 with a thickness of from 20 to 35 nm, a layer having a refractive index higher than 1.55 with a thickness of from 60 to 110 nm, optionally an electrically conductive layer with a thickness of from 3 to 10 nm, and a layer having a refractive index lower than 1.55, with a thickness of from 70 to 95 nm.

In additional embodiments, methods are disclosed of providing to a customer of an ophthalmic lens a rating of the ophthalmic lens with respect to luminance conditions, the rating being based on a ratio which quantifies the anti-reflective efficiency of the ophthalmic lens in scotopic or mesopic conditions, the method comprising the steps of: (a) identifying a range of luminance in the scotopic and/or mesopic vision regime; (b) identifying the average spectral luminous efficiency function $V_{\alpha,\beta}(\lambda)$ adapted to this range of luminance and calculating a ratio based on $\alpha$ and $\beta$; and (c) providing to a customer the rating of the ophthalmic lens.

In even more additional embodiments, there is disclosed an ophthalmic lens rated for quantifying the anti-reflective efficiency of ophthalmic lens in scotopic and/or mesopic conditions, the ophthalmic lens comprising a front face coated with a multilayered anti-reflective stack and an indication of a visual rating associated with the ophthalmic lens, the rating including a ratio based on values $\alpha$ and $\beta$ defining the average spectral luminous efficiency function $V_{\alpha,\beta}(\lambda)$ used for designing the anti-reflective stack.

The person skilled in the art, with general knowledge, is fully capable of choosing the suitable materials and thicknesses for the various layers of the anti-reflective coating so as to have the different desired parameters $R'_V$, $R_V$ and Rm.

The multilayered anti-reflective coating of the invention comprises a stack of at least one layer with a high refractive index and of at least one layer with a low refractive index.

More preferably, it comprises at least two layers with a low refractive index (LI) and at least two layers with a high refractive index (HI). It is here a simple stack, since the layer total number in the anti-reflective coating is higher than or equal to 3, preferably higher than or equal to 4, and lower than or equal to 7, more preferably lower than or equal to 6, even more preferably lower than or equal to 5, and most preferably equal to 5 layers.

As used herein, a layer of the anti-reflective coating is defined as having a thickness higher than or equal to 1 nm. Thus, any layer having a thickness lower than 1 nm will not be considered when counting the number of layers in the anti-reflective coating. The sub-layer is also not considered when counting the number of layers of the anti-reflective coating.

Unless stated otherwise, all thicknesses disclosed in the present application relate to physical thicknesses.

In the present application, a layer of the anti-reflective coating is said to be a layer with a high refractive index (HI) when its refractive index is higher than or equal to 1.55, preferably higher than or equal to 1.6, even more preferably higher than or equal to 1.7, even more preferably higher than or equal to 1.8 and most preferably higher than or equal to 1.9. A layer of an anti-reflective coating is said to be a low refractive index layer (LI) when its refractive index is lower than 1.55, preferably lower than or equal to 1.50, more preferably lower than or equal to 1.48 and most preferably lower than or equal to 1.47.

Unless otherwise specified, the refractive indexes referred to in the present application are expressed at 25° C. at a wavelength of 550 nm.

The HI layer is a traditional high refractive index layer that is well known in the art. It generally comprises one or more metal oxides such as, without limitation, zirconia ($ZrO_2$), titanium dioxide ($TiO_2$), alumina ($Al_2O_3$), silicon nitride ($Si_3N_4$), tantalum pentoxide ($Ta_2O_5$), neodymium oxide ($Nd_2O_5$), praseodymium oxide ($Pr_2O_3$), praseodymium titanate ($PrTiO_3$), lanthanum oxide ($La_2O_3$), niobium oxide ($Nb_2O_5$), yttrium oxide ($Y_2O_3$). Optionally, the HI layers may further contain silica or other materials with a low refractive index, provided they have a refractive index higher than or equal to 1.55 as indicated here above. The preferred materials include $TiO_2$, $PrTiO_3$, $ZrO_2$, $Al_2O_3$, $Y_2O_3$, $Si_3N_4$ and mixtures thereof.

The LI layer is also well known and may comprise, without limitation, silicon oxide, or a mixture of silica and alumina, especially silica doped with alumina, the latter contributing to increase the anti-reflective coating thermal resistance. The LI layer is preferably a layer comprising at least 80% by weight of silica, more preferably at least 90% by weight of silica, relative to the layer total weight, and even more preferably consists in a silica layer.

Optionally, the LI layers may further contain materials with a high refractive index, provided the refractive index of the resulting layer is lower than 1.55.

When a LI layer comprising a mixture of $SiO_2$ and $Al_2O_3$ is used, it preferably comprises from 1 to 10%, more preferably from 1 to 8% and even more preferably from 1 to 5% by weight of $Al_2O_3$ relative to the $SiO_2+Al_2O_3$ total weight in such layer.

For example, $SiO_2$ doped with 4% $Al_2O_3$ by weight, or less, or $SiO_2$ doped with 8% $Al_2O_3$ may be employed. $SiO_2/Al_2O_3$ mixtures, that are available on the market may be used, such as LIMA® marketed by the Umicore Materials AG company (refractive index n=1.48-1.50 at 550 nm), or L5® marketed by the Merck KGaA company (refractive index n=1.48 at 500 nm).

In one embodiment of the present invention, the anti-reflective coating outer layer is a silica-based layer, comprising preferably at least 80% by weight of silica, more preferably at least 90% by weight of silica (for example a silica layer doped with alumina), relative to the layer total weight, and even more preferably consists in a silica layer.

Generally, the HI layers have a physical thickness ranging from 10 to 120 nm, and the LI layers have a physical thickness ranging from 10 to 120 nm.

Generally, the anti-reflective coating total thickness is lower than 1 micrometer, preferably lower than or equal to 800 nm, more preferably lower than or equal to 500 nm and even more preferably lower than or equal to 250 nm. The anti-reflective coating total thickness is generally higher than 100 nm, preferably higher than 150 nm.

In one embodiment of the present invention, the anti-reflective coating is deposited onto a sub-layer. It should be noted that such anti-reflective coating sub-layer does not belong to the anti-reflective coating.

As used herein, an anti-reflective coating sub-layer or adhesion layer is intended to mean a relatively thick coating, used in order to improve the mechanical properties such as the abrasion resistance and/or the scratch resistance of said coating and/or so as to reinforce its adhesion to the substrate or to the underlying coating.

Because of its relatively high thickness, the sub-layer does not generally take part in the anti-reflective optical activity, especially when it has a refractive index close to that of the underlying coating (which is generally the anti-abrasion and anti-scratch coating) or to that of the substrate, if the sub-layer is directly deposited onto the substrate.

The sub-layer should have a thickness that is sufficient for promoting the abrasion resistance of the anti-reflective coating, but preferably not to such an extent that a light absorption could be caused, which, depending on the sub-layer nature, could significantly reduce the relative transmission factor v. Its thickness is generally lower than 300 nm, more preferably lower than 200 nm, and is generally higher than 90 nm, more preferably higher than 100 nm.

The sub-layer preferably comprises a $SiO_2$-based layer, this layer comprising preferably at least 80% by weight of silica, more preferably at least 90% by weight of silica, relative to the layer total weight, and even more preferably consists in a silica layer. The thickness of such silica-based layer is generally lower than 300 nm, more preferably lower than 200 nm, and is generally higher than 90 nm, more preferably higher than 100 nm.

In another embodiment, this $SiO_2$-based layer is a silica layer doped with alumina, in amounts such as defined here above, preferably consists in a silica layer doped with alumina.

In a particular embodiment, the sub-layer consists in a $SiO_2$ layer.

The optical article of the invention may be made antistatic, that is to say not to retain and/or develop a substantial static charge, by incorporating at least one charge dissipating conductive layer into the stack present on the surface of the article.

The charge dissipating conductive layer should be thin enough not to alter the transparency of the anti-reflective coating. The electrically conductive layer is preferably made from an electrically conductive and highly transparent material, generally an optionally doped metal oxide. In this case, the thickness thereof preferably varies from 1 to 15 nm, more preferably from 1 to 10 nm. Preferably, the electrically conductive layer comprises an optionally doped metal oxide, selected from indium, tin, zinc oxides and mixtures thereof. Tin-indium oxide ($In_2O_3$:Sn, tin-doped indium oxide), aluminum-doped zinc oxide (ZnO:Al), indium oxide ($In_2O_3$) and tin oxide ($SnO_2$) are preferred. In a most preferred embodiment, the electrically conductive and optically transparent layer is an indium-tin oxide layer, noted ITO layer or a tin oxide layer.

Generally, the electrically conductive layer contributes, within the stack, but in a limited manner, because of its low thickness, to obtaining anti-reflective properties and represents a layer with a high refractive index in the anti-reflective coating. This is the case for those layers made from an electrically conductive and highly transparent material such as ITO layers.

The anti-reflective coating does not comprise any layer with a thickness higher than or equal to 20 nm, preferably higher than 15 nm, based on tin oxide. When a plurality of indium oxide-based layers are present in the anti-reflective coating, their total thickness is preferably lower than 20 nm, more preferably lower than 15 nm. As used herein, an indium oxide-based layer is intended to mean a layer comprising at least 50% by weight of indium oxide relative to the layer total weight.

The various layers of the anti-reflective coating and the optional sub-layer are preferably deposited by vapor deposition, under vacuum, according to any of the following methods: i) by optionally ion-beam assisted, evaporation; ii) by ion-beam sputtering; iii) by cathode sputtering; iv) by plasma-assisted vapor deposition; v) by magnetron sputtering. These various methods are described in the following references "Thin Film Processes" and "Thin Film Processes II," Vossen & Kern, Ed., Academic Press, 1978 and 1991, respectively. A particularly recommended method is the evaporation under vacuum.

Preferably, the deposition of each of the layers of the anti-reflective coating and of the optional sub-layer is conducted by evaporation under vacuum.

According to one embodiment, the anti-reflective coating comprises, in the direction moving away from the substrate, a layer having a refractive index higher than or equal to 1.55 with a thickness of from 10 to 25 nm, a layer having a refractive index lower than 1.55 with a thickness of from 20 to 35 nm, a layer having a refractive index higher than 1.55 with a thickness of from 60 to 75 nm, optionally an electrically conductive layer with a thickness of from 3 to 10 nm, and a layer having a refractive index lower than 1.55, with a thickness of from 70 to 95 nm. In a preferred embodiment, the layer having a refractive index higher than or equal to 1.55 is made of at least zirconia and the layer having a refractive index lower than 1.55 is made of at least silica.

In another embodiment, the anti-reflective coating comprises, in the direction moving away from the substrate, a layer having a refractive index higher than or equal to 1.55 with a thickness of from 10 to 22 nm, a layer having a refractive index lower than 1.55 with a thickness of from 27 to 35 nm, a layer having a refractive index higher than 1.55 with a thickness of from 100 to 110 nm, optionally an electrically conductive layer with a thickness of from 3 to 10 nm, and a layer having a refractive index lower than 1.55, with a thickness of from 80 to 95 nm. In a preferred embodiment, the layer having a refractive index higher than or equal to 1.55 is made of at least tantalum pentoxide and the layer having a refractive index lower than 1.55 is made of at least magnesium fluoride.

The present invention provides hence an anti-reflective coating with an improved conception, comprising a stack made of thin layers, the thicknesses and materials of which have been selected so as to obtain satisfactory anti-reflective performances in the visible region under scotopic and/or mesopic conditions and eventually in the photopic conditions.

Preferably, the rear main face and the front main face of the ophthalmic lens are coated with said multilayered anti-reflective coating.

The anti-UV and/or anti-reflective coatings of the front face and of the rear face may be the same or different.

For instance, it is possible for the rear face of the optical article to be coated with an anti-reflective coating that is more efficient in scotopic and/or mesopic conditions than that of the substrate's front face (according to the characteristics described above). In particular, the optical article may be coated on its rear face with an anti-reflective coating having $R_v^{\alpha,\beta}$ lower than 1%, preferably lower than 0.75%, more preferably lower than 0.5% for an angle of incidence of 35° and coated on its front face with an anti-reflective coating having Rv lower than 1%, preferably lower than 0.75%, more preferably lower than 0.5% for an angle of incidence of 15°.

The anti-reflective coating may be deposited directly onto a bare substrate. In some applications, it is preferred for the main face of the substrate to be coated with one or more functional coatings prior to depositing the anti-reflective coating of the invention. These functional coatings traditionally used in optics may be, without limitation, an impact-resistant primer layer, an abrasion-resistant coating and/or a scratch-resistant coating.

Generally, the front and/or rear main face of the substrate onto which an anti-reflective coating will be deposited is coated with an impact-resistant primer layer, with an anti-abrasion and/or anti-scratch coating, or with an impact-resistant primer layer coated with an anti-abrasion and/or anti-scratch coating. The anti-abrasion and/or scratch-resistant coating may be any layer traditionally used as an anti-abrasion and/or anti-scratch coating in the field of ophthalmic lenses.

The anti-abrasion and/or scratch-resistant coatings are preferably hard coatings based on poly(meth)acrylates or silanes, generally comprising one or more mineral fillers intended to increase the hardness and/or the refractive index of the coating once cured.

Hard anti-abrasion and/or scratch-resistant coatings are preferably prepared from compositions comprising at least one alkoxysilane and/or a hydrolyzate thereof, obtained for example through hydrolysis with a hydrochloric acid solution and optionally condensation and/or curing catalysts.

Suitable coatings, that are recommended for the present invention include coatings based on epoxysilane hydrolyzates such as those described in the patents FR 2 702 486 (EP 0 614 957), U.S. Pat. Nos. 4,211,823 and 5,015,523.

A preferred anti-abrasion and/or scratch-resistant coating composition is the one disclosed in the patent FR 2 702 486. It comprises a hydrolyzate of epoxy trialkoxysilane and dialkyl dialkoxysilane, colloidal silica and a catalytic amount of an aluminum-based curing catalyst such as aluminum acetylacetonate, the rest being essentially composed of solvents traditionally used for formulating such compositions. Preferably, the hydrolyzate used is a hydrolyzate of 7-glycidoxypropyltrimethoxysilane (GLYMO) and dimethyldiethoxysilane (DMDES).

The anti-abrasion and/or scratch-resistant coating composition may be deposited onto the main face of the substrate by dip- or spin-coating. It is then cured by a suitable method (preferably using heat or ultraviolet radiation).

The thickness of the anti-abrasion and/or scratch-resistant coating does generally vary from 2 to 10 µm, preferably from 3 to 5 µm.

Prior to depositing the abrasion-resistant coating and/or the scratch-resistant coating, it is possible to apply onto the substrate a primer coating to improve the impact resistance and/or the adhesion of the subsequent layers in the final product. This coating may be any impact-resistant primer layer traditionally used for articles in a transparent polymer material, such as ophthalmic lenses.

Preferred primer compositions include compositions based on thermoplastic polyurethanes, such as those described in the Japanese patents JP 63-141001 and JP 63-87223, poly(meth)acrylic primer compositions, such as those described in the U.S. Pat. No. 5,015,523, compositions based on thermosetting polyurethanes, such as those described in the patent EP 0 404 111 and compositions based on poly(meth)acrylic latexes or polyurethane type latexes, such as those described in the U.S. Pat. No. 5,316,791 and EP 0 680 492.

Preferred primer compositions are compositions based on polyurethanes and compositions based on latexes, especially polyurethane type latexes optionally containing polyester units.

Commercially available primer compositions to be suitably used in the present invention include compositions such as Witcobond® 232, Witcobond® 234, Witcobond® 240, Witcobond® 242, Neorez® R-962, Neorez® R-972, Neorez® R-986 and Neorez® R-9603.

Combinations of such latexes may also be used in the primer, especially of polyurethane type latexes and poly (meth)acrylic latexes.

Such primer compositions may be deposited onto the article faces by dip- or spin-coating, thereafter be dried at a temperature of at least 70° C. and up to 100° C., preferably of about 90° C., for a time period ranging from 2 minutes to 2 hours, generally of about 15 minutes, to form primer layers having thicknesses, after curing, of from 0.2 to 2.5 µm, preferably of from 0.5 to 1.5 µm.

The optical article according to the invention may also comprise coatings formed on the anti-reflective coating and capable of modifying the surface properties thereof, such as hydrophobic and/or oleophobic coatings (antifouling top coat). These coatings are preferably deposited onto the outer layer of the anti-reflective coating. As a rule, their thickness is lower than or equal to 10 nm, does preferably range from 1 to 10 nm, more preferably from 1 to 5 nm.

There are generally coatings of the fluorosilane or fluorosilazane type. They may be obtained by depositing a fluorosilane or fluorosilazane precursor, comprising preferably at least two hydrolyzable groups per molecule. Fluorosilane precursors preferably comprise fluoropolyether moieties and more preferably perfluoropolyether moieties. These fluorosilanes are well known and are described, between others, in the U.S. Pat. Nos. 5,081,192, 5,763,061, 6,183,872, 5,739,639, 5,922,787, 6,337,235, 6,277,485 and EP 0 933 377.

A preferred hydrophobic and/or oleophobic coating composition is marketed by Shin-Etsu Chemical under the trade name KP 801M®. Another preferred hydrophobic and/or oleophobic coating composition is marketed by Daikin Industries under the trade name OPTOOL DSX®. It is a fluorinated resin comprising perfluoropropylene groups.

Instead of the hydrophobic coating, a hydrophilic coating may be used which provides antifog properties, or an antifog precursor coating which provides antifog properties when associated with a surfactant. Examples of such antifog precursor coatings are described in the patent application WO 2011/080472.

Typically, an ophthalmic lens according to the invention comprises a substrate that is successively coated on its rear face with an impact-resistant primer layer, an anti-abrasion and scratch-resistant layer, an anti-UV, anti-reflective coating according to the invention, and with a hydrophobic and/or oleophobic coating, or with a hydrophilic coating which provides antifog properties, or an antifog precursor coating. The ophthalmic lens according to the invention is preferably an ophthalmic lens for spectacles (spectacle lens), or a blank for ophthalmic lenses. The lens may be corrective, or not.

The front face of the substrate of the optical article may be successively coated with an impact-resistant primer layer, an abrasion-resistant layer and/or a scratch-resistant layer, an anti-reflective coating which may be, or not, an anti-UV, anti-reflective coating according to the invention, and with a hydrophobic and/or oleophobic coating.

In one embodiment, the optical article according to the invention does not absorb in the visible, or not much, which means in the context of the present application, that its transmission factor in the visible range w, also called relative transmission factor in the visible range, is higher than 90%, more preferably higher than 95%, even more preferably higher than 96% and most preferably higher than 97%.

The factor w should be understood as defined by the international normalized definition (ISO 13666:1998 Standard) and is measured in accordance with the ISO 8980-3 Standard. It is defined in the wavelength range of from 380 to 780 nm.

Preferably, the light absorption of the article coated according to the invention is lower than or equal to 1%.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description. Note that simply because a particular compound is ascribed to one particular generic formula does not mean that it cannot also belong to another generic formula.

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will recognize, or be able to ascertain using no more than routine experimentation, many equivalents to the specific embodiments of the invention described herein. Such equivalents are intended to be encompassed by the claims.

Example 1

1. General Procedures

Optical articles were designed with the target of achieving the minimum $R'_V$, produced, and tested. The optical articles used in the example comprise a lens substrate having a 65 mm diameter, a refractive index of 1.5 (ORMA® lens ESSILOR), and a power of −2.00 diopters, coated with a hard coat layer (such as those described in EP0614957) of refractive index: 1.48 and coated on its front face with the anti reflection coating of the invention (see TABLE 2). Two lenses are provided here as examples, the "$ZrO_2/SiO_2$" lens and the "$Ta_2O_5/MgF_2$" lens.

The ITO (tin doped indium oxide) layer is composed of 90% of indium oxide.

The layers of the anti-reflective coating were deposited without heating the substrates by evaporation under vacuum (evaporation source: electron gun).

The deposition frame is a Satis MC-380 machine fitted with an electron gun (STIH-270-2CKB (10 kV)) for evaporating oxides, and provided with an ion gun (Mark I) for the preliminary phase to prepare the surface of the substrate using argon ions (IPC).

TABLE 2

|   | $ZrO_2/SiO_2$ | | | $Ta_2O_5/MgF_2$ | | |
|---|---|---|---|---|---|---|
| | Layer | Physical Thickness in (nm) | Refractive Index | Layer | Physical Thickness in (nm) | Refractive Index |
| 1- | $SiO_2$ | 85.33 | 1.47 | $MgF_2$ | 86.79 | 1.38 |
| 2- | ITO | 6.50 | 2.08 | ITO | 6.50 | 2.08 |
| 3- | $ZrO_2$ | 62.93 | 2.00 | $Ta_2O_5$ | 108.97 | 2.15 |
| 4- | $SiO_2$ | 28.24 | 1.47 | $MgF_2$ | 31.36 | 1.38 |
| 5- | $ZrO_2$ | 18.75 | 2.00 | $Ta_2O_5$ | 12.53 | 2.15 |
| Substrate | ORMA ® + Hard Coat | | 1.48 | ORMA ® + Hard Coat | | 1.48 |

The thickness of the layers was controlled by means of a quartz microbalance. The spectral measurements were effected on a variable incidence-spectrophotometer Perkin-Elmer Lambda 850 with an URA accessory (Universal Reflectance Accessory).

2. Test Procedure

The method for making optical articles comprises the step of introducing the substrate, a step of activating the surface of the substrate by means of an argon ion beam (anode current: 0.8 A, anode voltage: 100 V, neutralization current: 40 mA), turning the ion irradiation off, then subsequently the various layers of the anti-reflective coating by successive evaporations and at last a ventilation step.

3. Results

Figure 3A:
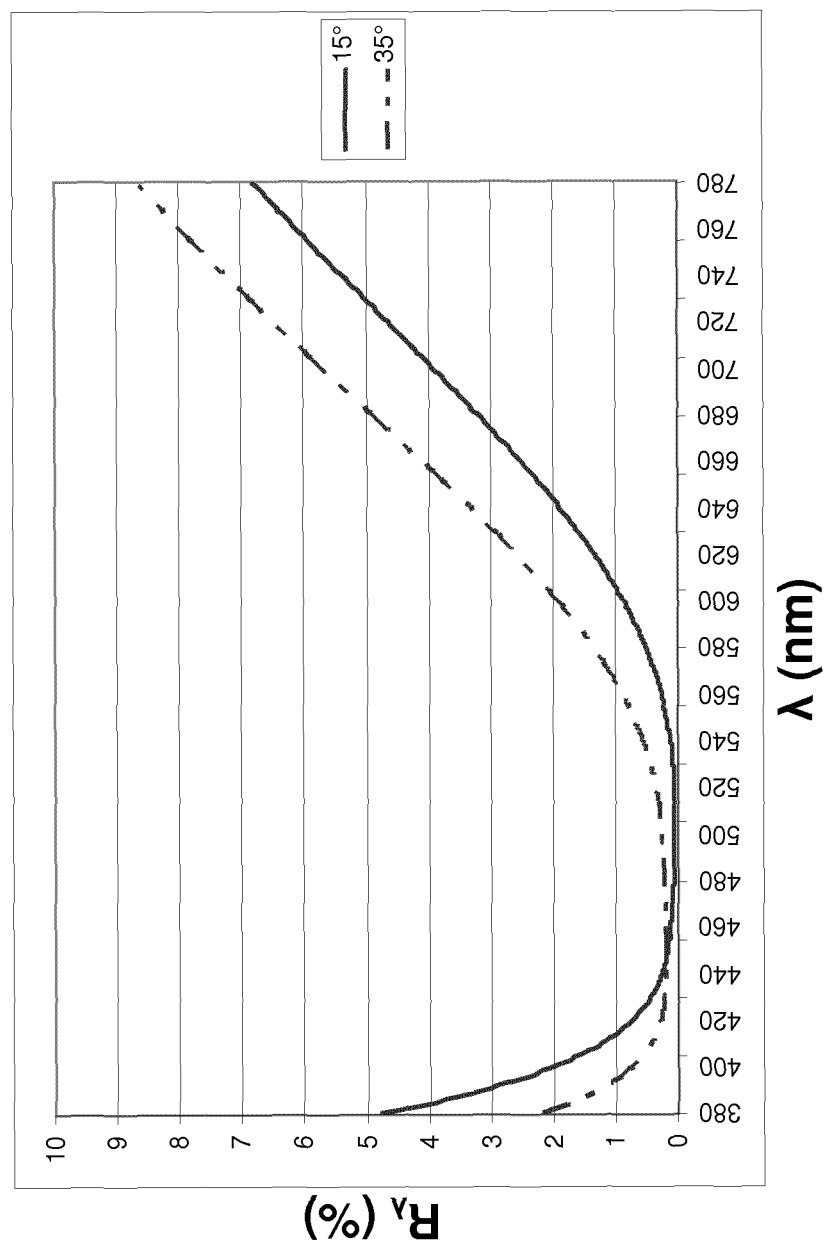
FIGS. 3A-B illustrates the reflection spectrum (%) between 380 and 780 nm of the $ZrO_2/SiO_2$ (3A) and $Ta_2O_5/MgF_2$ (3B) antireflective stack.
Figure 3B:
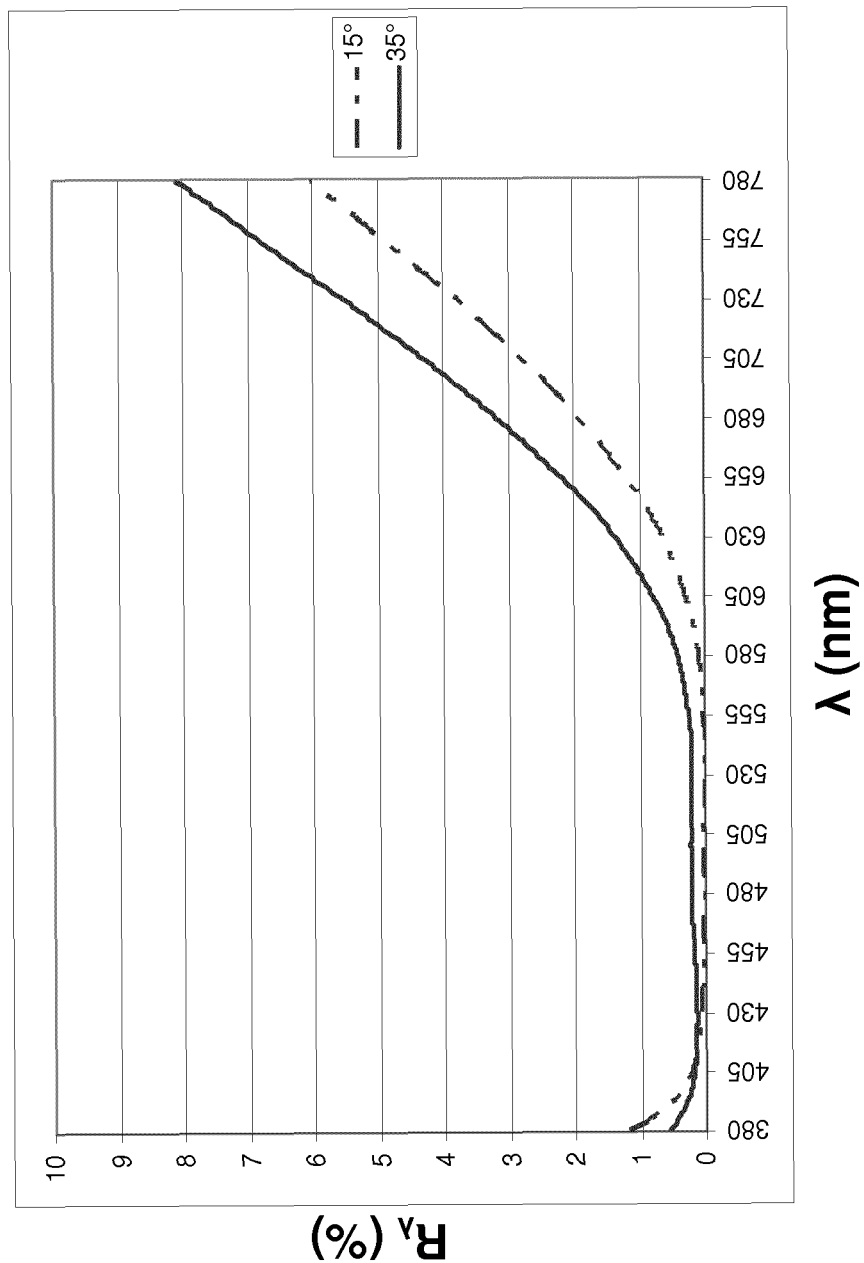

The structural characteristics and the optical performances of the $ZrO_2/SiO_2$ and $Ta_2O/MgF_2$ ophthalmic lenses obtained are detailed hereunder. The reflection graphs between 380 and 780 nm of some articles prepared are illustrated on FIG. 3.

The reflection mean factor values are those of the front face. The factors $R_V$ and $R'_V$ are provided for an angle of incidence Θ of 15° or 35° and the colorimetric coefficients of the optical article of the invention in the international colorimetric system CIE L*,a*,b*, chroma (C*), and hue (h*) are calculated between 380 and 780 nm, taking the standard illuminant D 65 at various angle of incidence Θ and the observer into account (angle of 10°) (for all the examples) (see Table 3).

Lenses according to example 1 above possess very good anti-reflective properties in the visible region under both $R_V$ and $R'_V$ analysis. In both the $ZrO_2/SiO_2$ and the $Ta_2O_5/MgF_2$ lenses, $R'_V$ is lower than $R_V$ under tested configuration. Particularly, $R'_V$ of the as-designed anti-reflective $Ta_2O/MgF_2$ stack using $Ta_2O_5/MgF_2$ materials is extremely low, 0.02% as shown in Table 3, which is very promising for night vision & night activity applications. In addition, $R'_V$ is very low for various angle of incidence, suited for front face or rear face of ophthalmic lenses.

TABLE 3

| Properties | ZrO₂/SiO₂ Lens | | Ta₂O₅/MgF₂ Lens | |
|---|---|---|---|---|
| | 15° | 35° | 15° | 35° |
| L* | 3.71 | 9.00 | 1.04 | 3.82 |
| a* | 12.59 | 14.67 | 4.70 | 8.05 |
| b* | 2.25 | 12.07 | 1.16 | 3.85 |
| C* | 12.79 | 19.00 | 4.84 | 8.92 |
| h* | 10.1 | 39.4 | 13.9 | 25.50 |
| $R_V$ | 0.43 | 1.06 | 0.12 | 0.44 |
| $R_V'$ | 0.13 | 0.37 | 0.02 | 0.22 |

Example 2

Optical articles were designed with the target of achieving the minimum $R_V^{1/3,2/3}$ (lenses a), and the minimum $R_V^{2/3,1/3}$ (lenses b), produced with the same material and procedures as for example 1 and tested. The optical articles used in the example comprise a lens substrate having a 65 mm diameter, a refractive index of 1.5 (ORMA® lens ESSILOR), and a power of −2.00 diopters, coated with a hard coat layer (such as those described in EP0614957) of refractive index: 1.48 and coated on its front face with the anti reflection coating of the invention (see TABLE 4 and 5). Four lenses are provided here as examples.

TABLE 4

| | Layer | Refractive Index | (ZrO₂/SiO₂): Lens a Physical Thickness in (nm) | (ZrO₂/SiO₂): Lens b Physical Thickness in (nm) |
|---|---|---|---|---|
| 1- | SiO₂ | 1.47 | 88.5 | 90.8 |
| 2- | ITO | 2.08 | 6.5 | 6.5 |
| 3- | ZrO₂ | 2.00 | 65.9 | 68.5 |
| 4- | SiO₂ | 1.47 | 28.2 | 28.4 |
| 5- | ZrO₂ | 2.00 | 20.5 | 20.8 |
| Substrate | ORMA ® + Hard Coat | 1.48 | | |

TABLE 5

| | Layer | Refractive Index | (Ta₂O₅/MgF₂): Lens a Physical Thickness in (nm) | (Ta₂O₅/MgF₂): Lens b Physical Thickness in (nm) |
|---|---|---|---|---|
| 1- | MgF₂ | 1.38 | 91.7 | 93.8 |
| 2- | ITO | 2.08 | 6.5 | 6.5 |
| 3- | Ta₂O₅ | 2.15 | 118.2 | 120.2 |
| 4- | MgF₂ | 1.38 | 34.3 | 34.6 |
| 5- | Ta₂O₅ | 2.15 | 13.7 | 13.9 |
| Substrate | ORMA ® + Hard Coat | 1.48 | | |

The reflection mean factor values are those of the front face. The factors $R_V^{\alpha,\beta}$ are provided for an angle of incidence Θ of 15, taking the standard illuminant D 65 and the observer into account (angle of 10°) (for all the examples) (see Table 6).

TABLE 6

| $R_V^{\alpha,\beta}$ | ZrO₂/SiO₂ | | Ta₂O₅/MgF₂ | |
|---|---|---|---|---|
| | Lens a | Lens b | Lens a | Lens b |
| $R_V^{1,0} = Rv$ | 0.24 | 0.20 | 0.068 | 0.048 |
| $R_V^{1/3,2/3}$ | 0.17 | — | 0.033 | — |
| $R_V^{2/3,1/3}$ | — | 0.19 | — | 0.034 |
| $R_V^{0,1} = Rv'$ | 0.18 | 0.25 | 0.056 | 0.089 |

Lenses according to example 2 above possess very good anti-reflective properties in the visible region with all conditions ranging from scotopic to photopic vision. Especially, reflection mean factor values show very little variation in different conditions, which is very promising for lenses adapted to all kind of conditions.

Example 3

Figure 4:
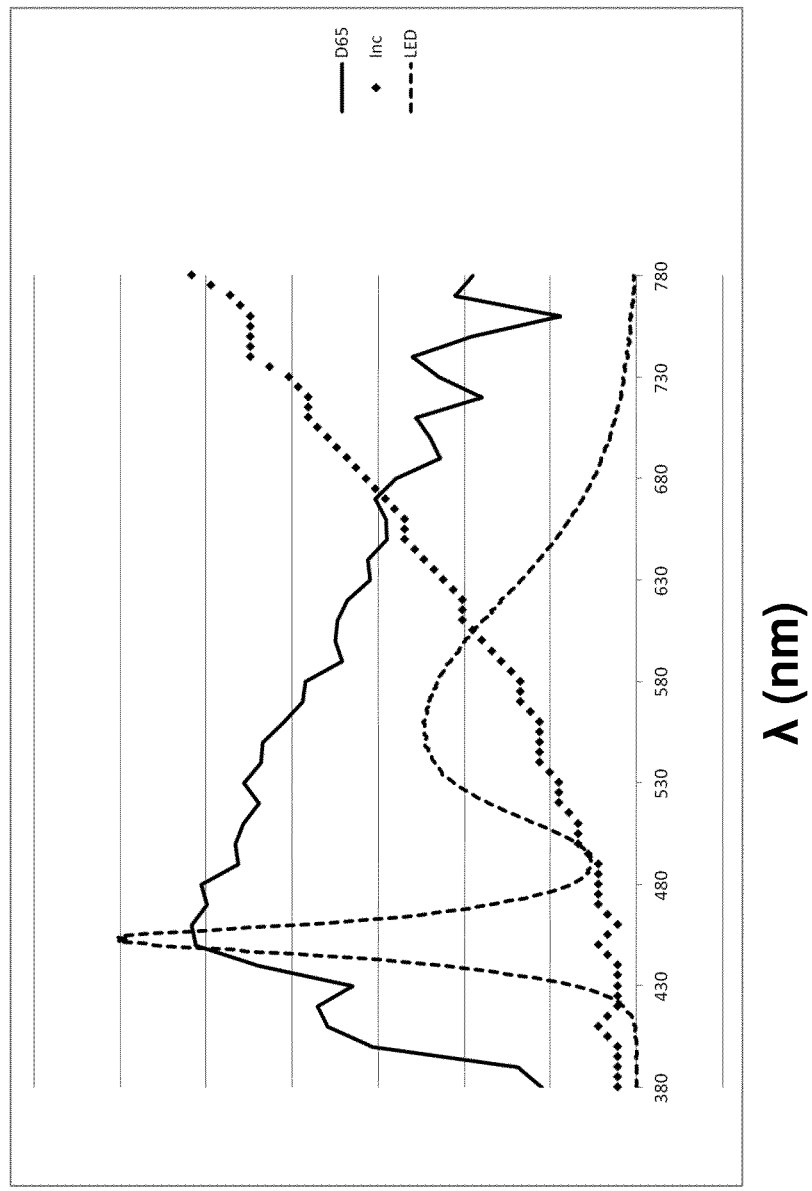
FIG. 4 illustrates spectra (in arbitrary unit) of D65 standard illuminant (solid line), incandescent light (diamonds) and LED 4800 (dotted line) versus Wavelength λ in nanometers (nm).

Similarly to example 1, lenses have been designed for different illuminants, representative of artificial light sources, which are more representative of light exposure during night. Light emitting diodes of commercial type LED 4800 and incandescent bulbs have been used. Light sources spectra Ilum(λ) for both sources are shown on FIG. 4. ZrO₂/SiO₂ LED, ZrO₂/SiO₂ Inc, Ta₂O₅/MgF₂ LED and Ta₂O₅/MgF₂ Inc with the anti reflection coating of the invention (TABLE 7 and 8) are provided here as examples

TABLE 7

| | Layer | Refractive Index | (ZrO₂/SiO₂): LED Physical Thickness in (nm) | (ZrO₂/SiO₂): Inc Physical Thickness in (nm) |
|---|---|---|---|---|
| 1- | SiO₂ | 1.47 | 86.5 | 87.7 |
| 2- | ITO | 2.08 | 6.5 | 6.5 |
| 3- | ZrO₂ | 2.00 | 63.2 | 65.4 |
| 4- | SiO₂ | 1.47 | 28.3 | 28.9 |
| 5- | ZrO₂ | 2.00 | 20.2 | 18.8 |
| Substrate | ORMA ® + Hard Coat | 1.48 | | |

TABLE 8

| | Layer | Refractive Index | (Ta₂O₅/MgF₂): LED Physical Thickness in (nm) | (Ta₂O₅/MgF₂): Inc Physical Thickness in (nm) |
|---|---|---|---|---|
| 1- | MgF₂ | 1.38 | 86.8 | 89.43 |
| 2- | ITO | 2.08 | 6.5 | 6.5 |
| 3- | Ta₂O₅ | 2.15 | 107.3 | 112.4 |
| 4- | MgF₂ | 1.38 | 29.5 | 32.2 |
| 5- | Ta₂O₅ | 2.15 | 12.0 | 13.1 |
| Substrate | ORMA ® + Hard Coat | 1.48 | | |

Rv and Rv' for these lighting conditions are shown in Table 9. For ZrO₂/SiO₂ LED and Ta₂O₅/MgF₂ LED lenses, Rv and Rv' were calculated with Ilum(λ) corresponding to LED 4800 light source and D65 standard illuminant (see FIG. 4). For ZrO₂/SiO₂ Inc and Ta₂O₅/MgF₂ Inc lenses, Rv and Rv' were calculated with Ilum(λ) corresponding to incandescent light source and D65 standard illuminant (see FIG. 4).

TABLE 9

|  | Illuminant | ZrO$_2$/SiO$_2$ | | Ta$_2$O$_5$/MgF$_2$ | |
|---|---|---|---|---|---|
|  |  | LED | Inc | LED | Inc |
| Rv | LED | 0.34 |  | 0.10 |  |
| Rv' | LED | 0.14 |  | 0.020 |  |
| Rv | Incandescent |  | 0.46 |  | 0.13 |
| Rv' | Incandescent |  | 0.13 |  | 0.024 |
| Rv | D65 | 0.35 | 0.28 | 0.12 | 0.068 |
| Rv' | D65 | 0.14 | 0.16 | 0.026 | 0.029 |

Lenses according to example 3 above possess very good anti-reflective properties in the visible region with various lighting conditions and ranging from scotopic to photopic vision. Especially, reflection mean factor values show very little variation in different lighting conditions, which is very promising for lenses adapted to all situations. In addition, R'$_V$ is lower than R$_V$ under these tested configuration, showing that these lenses are especially adapted to artificial lighting conditions.

All of the methods and apparatuses disclosed and claimed herein can be made and executed without undue experimentation in light of the present disclosure. While the compositions and methods of this invention have been described in terms of preferred embodiments, it will be apparent to those of skill in the art that variations may be applied to the methods and apparatuses and in the steps or in the sequence of steps of the methods described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

The invention claimed is:

1. An ophthalmic lens comprising an anti-reflective stack designed for scotopic or mesopic conditions, wherein:
   the anti-reflective stack design method uses the spectral luminous efficiency function V'($\lambda$) as defined in CIE 1951 and an average spectral luminous efficiency function $V_{\alpha,\beta}(\lambda)=\alpha V(\lambda)+\beta V'(\lambda)$, with $\beta>0$, V($\lambda$) is in CIE 1931 and V'($\lambda$) is in CIE 1951; and
   the anti-reflective stack has a mean light reflection $R_V^{\alpha,\beta}$ value that is calculated according to:

$$R_V^{\alpha,\beta} = \frac{\int_{380}^{780} R(\lambda) \cdot V_{\alpha,\beta}(\lambda) \cdot Ilum(\lambda) \cdot d\lambda}{\int_{380}^{780} V_{\alpha,\beta}(\lambda) \cdot Ilum(\lambda) \cdot d\lambda}$$

wherein R($\lambda$) is the light reflection spectrum of the anti-reflective stack and Ilum($\lambda$) is a reference illuminant.

2. The ophthalmic lens according to claim 1 comprising a transparent substrate with a front main face and with a rear main face, at least one of the main faces being coated with a multilayered anti-reflective stack comprising at least one layer having a refractive index higher than or equal to 1.55 and at least one layer having a refractive index lower than 1.55, such that:
   the mean light reflection factor in the visible region for photopic vision R$_V$ with D$_{65}$ illuminant is lower than or equal to 0.5%, for at least an angle of incidence lower than 35°; and
   the mean light reflection factor in the visible region for scotopic or mesopic vision $R_V^{\alpha,\beta}$ with D$_{65}$ illuminant is lower than the mean light reflection factor in the visible region for photopic vision R$_V$ for at least an angle of incidence lower than 35° and a ratio $\alpha/\beta \leq 10$.

3. The ophthalmic lens according to claim 2, wherein the multilayered anti-reflective coating comprises a number of layers higher than or equal to 3 and lower than or equal to 10, preferably higher than or equal to 4 and lower than or equal to 6.

4. The ophthalmic lens according to claim 1, wherein the hue of the light reflected by the anti-reflective coating is in the range from 0° to 150° for at least an angle of incidence lower than 35°.

5. The ophthalmic lens according to claim 1, wherein mean reflection factor Rm of anti-reflective coating is lower than 1% for at least an angle of incidence lower than 35°.

6. The ophthalmic lens according to claim 1, wherein the anti-reflective coating comprises, in the direction moving away from the substrate, a layer having a refractive index higher than or equal to 1.55 with a thickness of from 10 to 25 nm, a layer having a refractive index lower than 1.55 with a thickness of from 20 to 35 nm, a layer having a refractive index higher than 1.55 with a thickness of from 60 to 110 nm, optionally an electrically conductive layer with a thickness of from 3 to 10 nm, and a layer having a refractive index lower than 1.55, with a thickness of from 70 to 95 nm.

7. The ophthalmic lens according to claim 1 comprising a front face coated with said multilayered anti-reflective stack and an indication of a visual rating associated with the ophthalmic lens, wherein the visual rating including a ratio based on values $\alpha$ and $\beta$ defining the average spectral luminous efficiency function $V_{\alpha,\beta}(\lambda)$ used for designing the anti-reflective stack.

8. A method of designing an anti-reflective stack comprising:
   (a) identifying a luminance in the scotopic vision regime;
   (b) calculating the weighted mean light reflection in scotopic conditions R$_V$' of an anti-reflective stack having a light reflection spectrum R($\lambda$) according to:

$$R'_V = \frac{\int_{380}^{780} R(\lambda) \cdot V_{0,1}(\lambda) \cdot Ilum(\lambda) \cdot d\lambda}{\int_{380}^{780} V_{0,1}(\lambda) \cdot Ilum(\lambda) \cdot d\lambda}$$

(c) designing an anti-reflective stack by selecting materials to achieve the light reflection spectrum R($\lambda$) yielding the calculated R$_V$' value,
wherein $V_{0,1}(\lambda)$=V'($\lambda$) is in CIE 1951 and Ilum($\lambda$) is a reference illuminant.

9. The method of claim 8, wherein R$_V$' is less than or equal to 1%, preferably less than or equal to 0.5%.

10. The method of claim 8, further defined as manufacturing an ophthalmic lens having an anti-reflective stack, further comprising:
   (d) providing an optical article having two main faces; and
   (e) forming the anti-reflective stack on at least one main face of the ophthalmic lens.

11. A method of designing an anti-reflective stack comprising:
   (a) identifying a range of luminance in the scotopic and/or mesopic vision regime;

(b) calculating the average spectral luminous efficiency function $V_{\alpha,\beta}(\lambda)$ of the range of luminance according to:

$$V_{\alpha,\beta}(\lambda)=\alpha V(\lambda)+\beta V'(\lambda)$$

wherein $\alpha$ and $\beta$ are selected according to the luminance conditions, $\beta>0$, $V(\lambda)$ is in CIE 1931 and $V'(\lambda)$ is in CIE 1951;

(c) designing an anti-reflective stack by use of $V_{\alpha,\beta}(\lambda)$ function.

12. The method of designing an anti-reflective stack according to claim 11 in which step (c) comprises the following steps:

(c1) calculating the weighted mean light reflection $R_V^{\alpha,\beta}$ of an anti-reflective stack having a light reflection spectrum $R(\lambda)$ according to:

$$R_V^{\alpha,\beta} = \frac{\int_{380}^{780} R(\lambda) \cdot V_{\alpha,\beta}(\lambda) \cdot Ilum(\lambda) \cdot d\lambda}{\int_{380}^{780} V_{\alpha,\beta}(\lambda) \cdot Ilum(\lambda) \cdot d\lambda}$$

(c2) designing an anti-reflective stack by selecting materials to achieve the light reflection spectrum $R(\lambda)$ yielding the calculated $R_V^{\alpha,\beta}$ value, wherein $Ilum(\lambda)$ is a reference illuminant.

13. The method of claim 11, wherein $R_V^{\alpha,\beta}$ is less than or equal to 1%, preferably less than or equal to 0.5%.

14. The method of claim 11, further defined as manufacturing an ophthalmic lens having an anti-reflective stack, further comprising:

(d) providing an optical article having two main faces; and (e) forming the anti-reflective stack on at least one main face of the ophthalmic lens.

15. The method of claim 14 further comprising providing to a customer of said ophthalmic lens a rating of the ophthalmic lens with respect to luminance conditions, the rating being based on a ratio $\alpha/\beta$, which quantifies the anti-reflective efficiency of the ophthalmic lens in scotopic or mesopic conditions.

* * * * *